United States Patent
Zirbes et al.

(10) Patent No.: US 11,009,332 B2
(45) Date of Patent: May 18, 2021

(54) TAPE MEASURE END HOOK PROTECTION

(71) Applicant: STANLEY BLACK & DECKER, INC., New Britain, CT (US)

(72) Inventors: Justin David Zirbes, Bristol, CT (US); Antony J. Orsini, Cheshire, CT (US)

(73) Assignee: Stanley Black & Decker, Inc., New Britain, CT (US)

( * ) Notice: Subject to any disclaimer, the term of this patent is extended or adjusted under 35 U.S.C. 154(b) by 109 days.

(21) Appl. No.: 16/279,042

(22) Filed: Feb. 19, 2019

(65) Prior Publication Data

US 2020/0263969 A1    Aug. 20, 2020

(51) Int. Cl.
*G01B 3/10* (2020.01)
*G01B 3/1056* (2020.01)

(52) U.S. Cl.
CPC .... *G01B 3/1056* (2013.01); *G01B 2003/1058* (2013.01)

(58) Field of Classification Search
CPC .................................................. G01B 3/1056
USPC .......................................... 33/757, 758, 770
See application file for complete search history.

(56) References Cited

U.S. PATENT DOCUMENTS

| | | | |
|---|---|---|---|
| 2,629,935 A * | 2/1953 | Roe ...................... | G01B 3/1056 33/770 |
| 4,823,921 A | 4/1989 | Bosco | |
| 5,010,657 A * | 4/1991 | Knapp ................. | G01B 3/1056 33/755 |
| 5,402,583 A * | 4/1995 | Komura ............... | G01B 3/1056 33/758 |
| 6,052,914 A * | 4/2000 | Soon .................... | G01B 3/1056 33/755 |
| 6,637,126 B2 | 10/2003 | Balota | |
| 6,658,908 B1 | 12/2003 | Ghiran et al. | |
| 7,406,778 B2 | 8/2008 | Lee et al. | |

(Continued)

FOREIGN PATENT DOCUMENTS

| | | |
|---|---|---|
| DE | 102014112515 A1 | 3/2016 |
| EP | 1444479 A1 | 8/2004 |

(Continued)

OTHER PUBLICATIONS

International Search Report and Written Opinion, dated Jun. 10, 2020, for corresponding PCT application No. PCT/US2020/017204.

(Continued)

*Primary Examiner* — George B Bennett
(74) *Attorney, Agent, or Firm* — Gabriel A. Haboubi

(57) ABSTRACT

A measuring tool comprises an end hook having a mounting portion, blade, hole extending through the blade, and a fastener extending through the hole and securing the blade to the mounting portion. The blade generally has an average first thickness along its length. The hole formed in the blade has a depth which is greater than the first thickness through a protrusion of blade material extending from the blade. Similarly, a method of forming a tape measure blade may forming a blade generally having an average first thickness along its length, forming a hole in the blade along a hole axis, near a first end of the blade, the hole having a depth that is greater than the first thickness through a protrusion of blade material extending from the blade, and extending a fastener through the hole to secure the blade to a mounting portion of the end hook.

22 Claims, 5 Drawing Sheets

(56) References Cited

U.S. PATENT DOCUMENTS

| | | | |
|---|---|---|---|
| 7,626,106 B2 | 12/2009 | Stannard | |
| 8,555,592 B2 | 10/2013 | Daudet et al. | |
| 2004/0064962 A1* | 4/2004 | Liu | G01B 3/1056 33/758 |
| 2010/0175273 A1* | 7/2010 | Seo | G01B 3/1056 33/770 |
| 2013/0056590 A1 | 3/2013 | Kennedy | |
| 2013/0298417 A1* | 11/2013 | Huang | G01B 3/1056 33/758 |
| 2014/0007444 A1* | 1/2014 | Murray | G01B 3/1056 33/770 |
| 2014/0196302 A1* | 7/2014 | Ricalde | G01B 3/1041 33/770 |
| 2015/0241192 A1* | 8/2015 | Kuo | G01B 3/1071 33/768 |
| 2020/0225017 A1* | 7/2020 | Orsini | G01B 3/1003 |

FOREIGN PATENT DOCUMENTS

| | | |
|---|---|---|
| EP | 1476714 B1 | 7/2008 |
| EP | 1990601 A1 | 11/2008 |
| EP | 2905091 B1 | 8/2015 |
| EP | 3375542 B1 | 9/2018 |
| GB | 2407163 A | 4/2005 |
| KR | 200415429 Y1 | 5/2006 |
| WO | 18048810 A1 | 3/2018 |

OTHER PUBLICATIONS

Written Opinion of the International Searching Authority, dated Jun. 10, 2020, for corresponding PCT application No. PCT/US2020/017204.

* cited by examiner

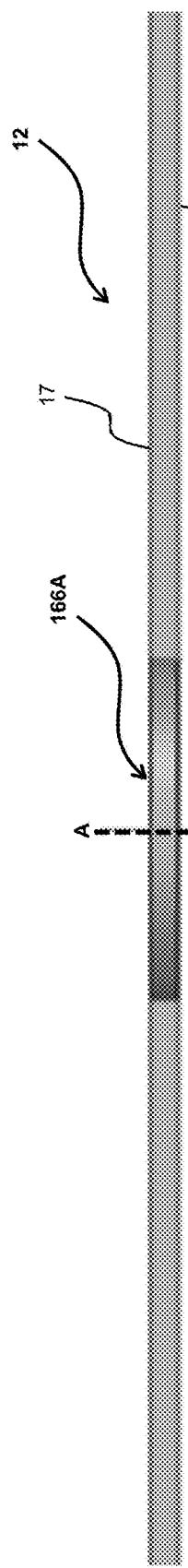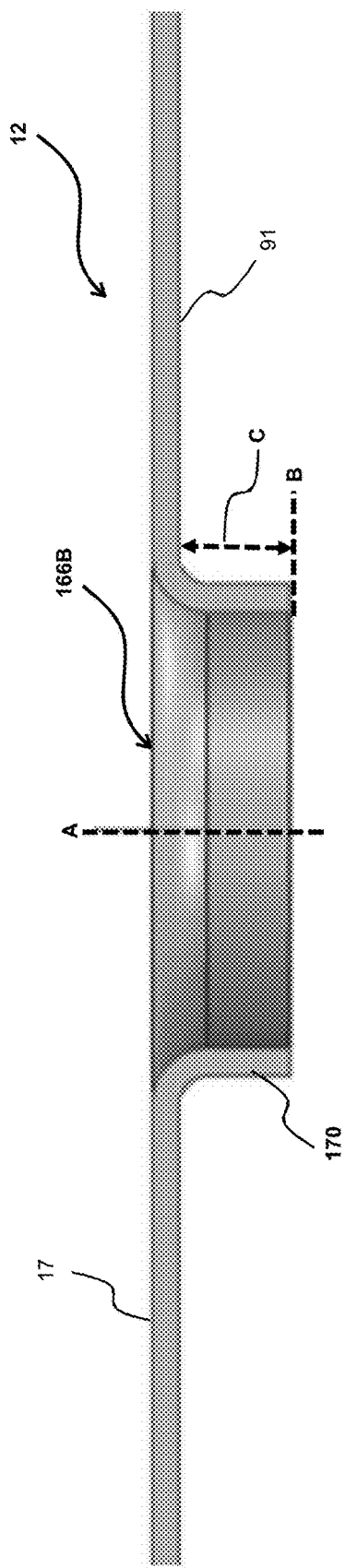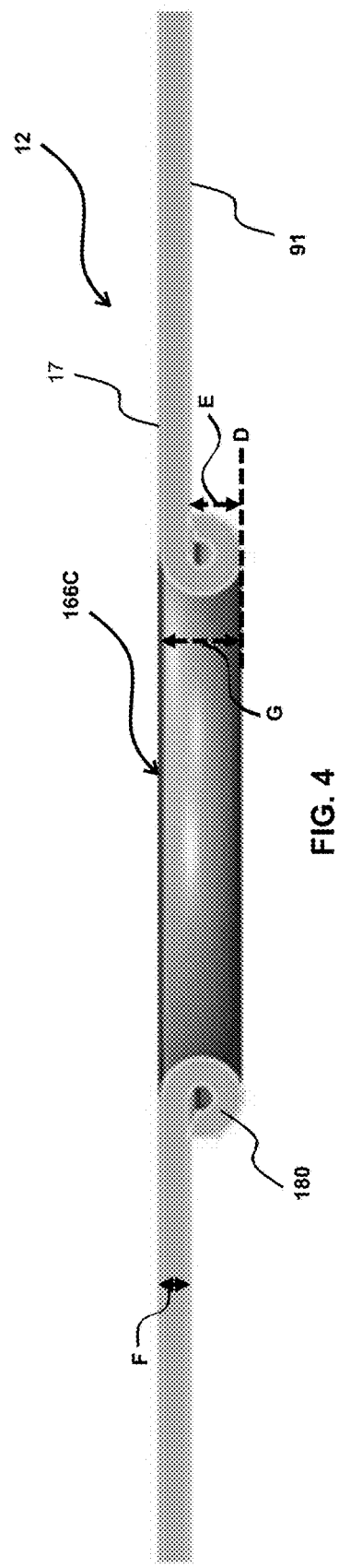

US 11,009,332 B2

TAPE MEASURE END HOOK PROTECTION

FIELD OF THE INVENTION

The present invention relates generally to hand tools, and more particularly to tape measures.

BACKGROUND OF THE INVENTION

Tape measures conventionally include a retractable tape having measuring indicia thereon that is spring biased into a housing. A front of the tape commonly includes a hook that provides a surface to engage and fix the end of the tape against a point to be measured from, so the measurement can be made from the hook to a position on the tape indicated by the measuring indicia. The housing often has a lock mechanism that allows the tape to be locked into a certain position relative to the housing (e.g., locked into an extended position, preventing the spring bias from retracting the tape into the housing).

Among other things, the present application relates to various improvements to tape measures, including strengthening the front of the tape to prevent separation of the end hook from the tape blade, either through impact of the hook against the housing of the tape due to excessive retraction under the spring force, impact against the hook, or so on.

SUMMARY OF THE INVENTION

According to an embodiment, a measuring tool comprises an end hook having a mounting portion; a blade having a length and a width, the length being greater than the width; a hole extending through the blade along a hole axis, near a first end of the blade; and a fastener extending through the hole and securing the blade to the mounting portion of the end hook. The blade generally has an average first thickness along the length of the blade. The hole formed in the blade has a depth of a second thickness. The second thickness is greater than the first thickness through a protrusion of blade material extending from the blade.

According to another embodiment, a method of forming a tape measure blade with a reinforced connection to an end hook includes forming a blade having a length and a width, the length being greater than the width, wherein the blade generally has an average first thickness along the length of the blade. The method also includes forming a hole in the blade along a hole axis, near a first end of the blade, wherein the hole formed in the blade has a depth of a second thickness that is greater than the first thickness through a protrusion of blade material extending from the blade. The method further includes extending a fastener through the hole to secure the blade to a mounting portion of the end hook.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

Features of tape measures in accordance with one or more embodiments are shown in the drawings, in which like reference numerals designate like elements. The drawings form part of this original disclosure in which:

FIG. 2 illustrates a cross sectional view of the formation of a pilot hole prior to creation of a reinforced hole in the hook end of the tape blade FIG. 3 illustrates a cross sectional view of the formation of a deeper hole with a protruding wall in the hook end through friction drilling as part of creating the reinforced hole;

FIG. 4 illustrates a cross sectional view of rolling the protruding wall into a bead surrounding the hole to create the reinforced hole.

DETAILED DESCRIPTION OF THE ILLUSTRATED EMBODIMENT(S)

Tape measure blades are usually formed of metal, and have measurement indicia and other coatings provided for color, ink wear resistance, and overall abrasion resistance. In some embodiments, a polymer coating is provided that is usually thick relative to a metal substrate of a blade. Such thick coatings may require consideration when designing other aspects of a tape measure (e.g., how long the tape may be, the size and arrangement of components within a tape measure housing, etc.) Such coatings or similar appliques (e.g. reinforcements, such as of metal) are usually thicker near the free end of the blade, adjacent to the hook, to prevent damage at those points of the blade, in particular where the hook is attached to the blade through rivets or other fasteners extending through the blade. Even with the thick coatings, typical blades may tend to weaken, kink, crack, or break at the attachment point between the blade and a blade hook, especially after prolonged use, or improper use such as uncontrolled retraction of the blade.

Figure 1A:
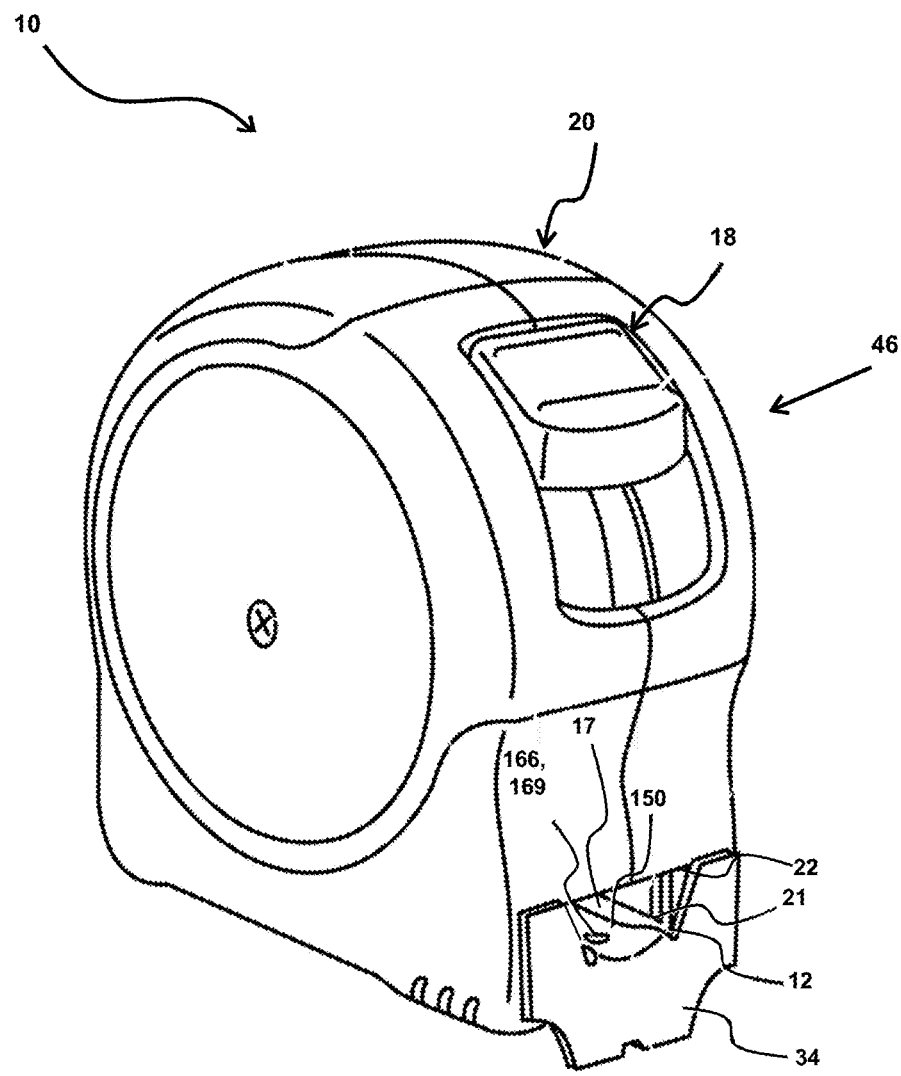
FIG. 1A illustrates a perspective view of a self-retracting tape measure.
Figure 1B:
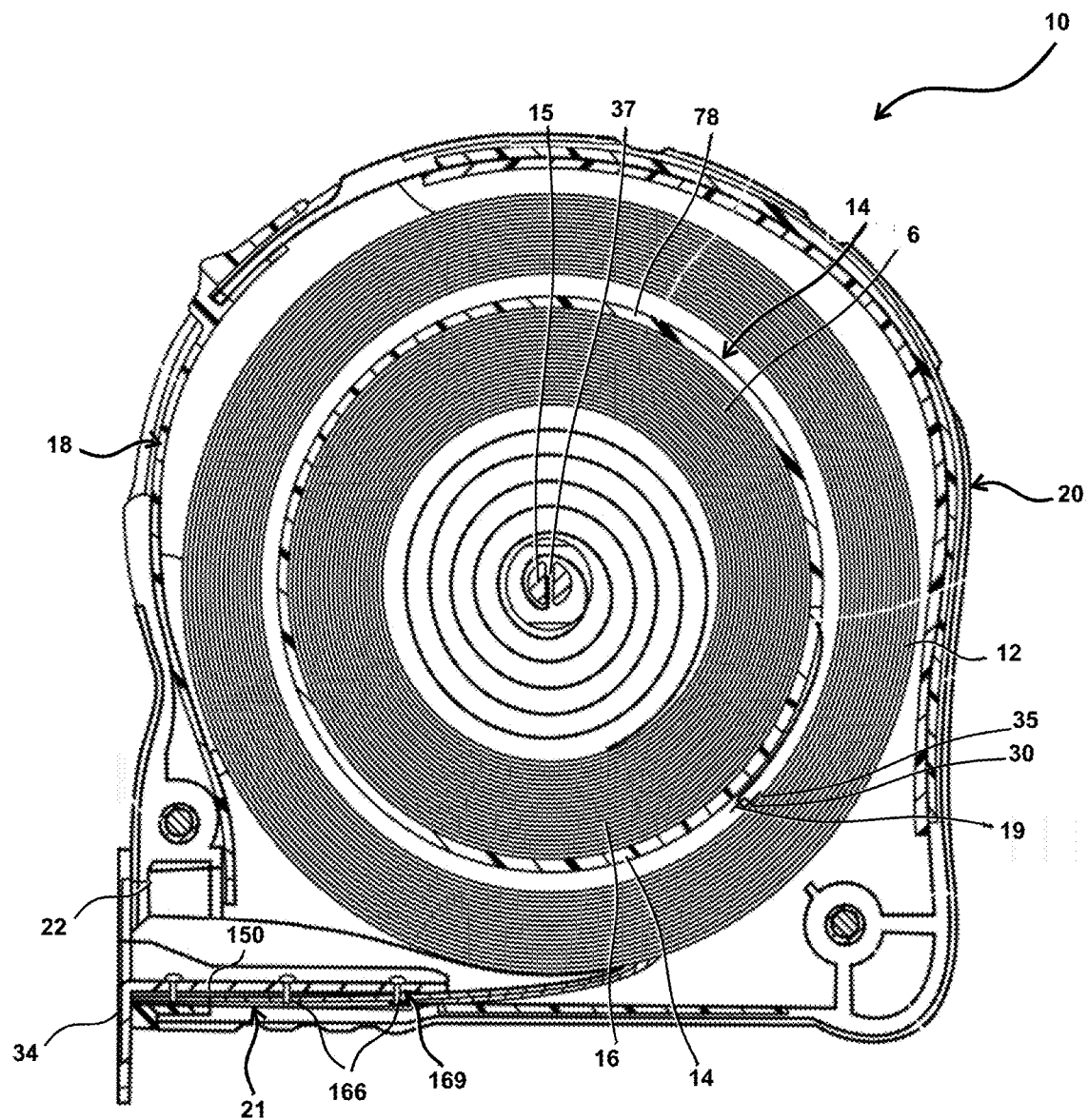
FIG. 1B illustrates a cross-sectional view of the self-retracting tape measure.
Figure 1C:
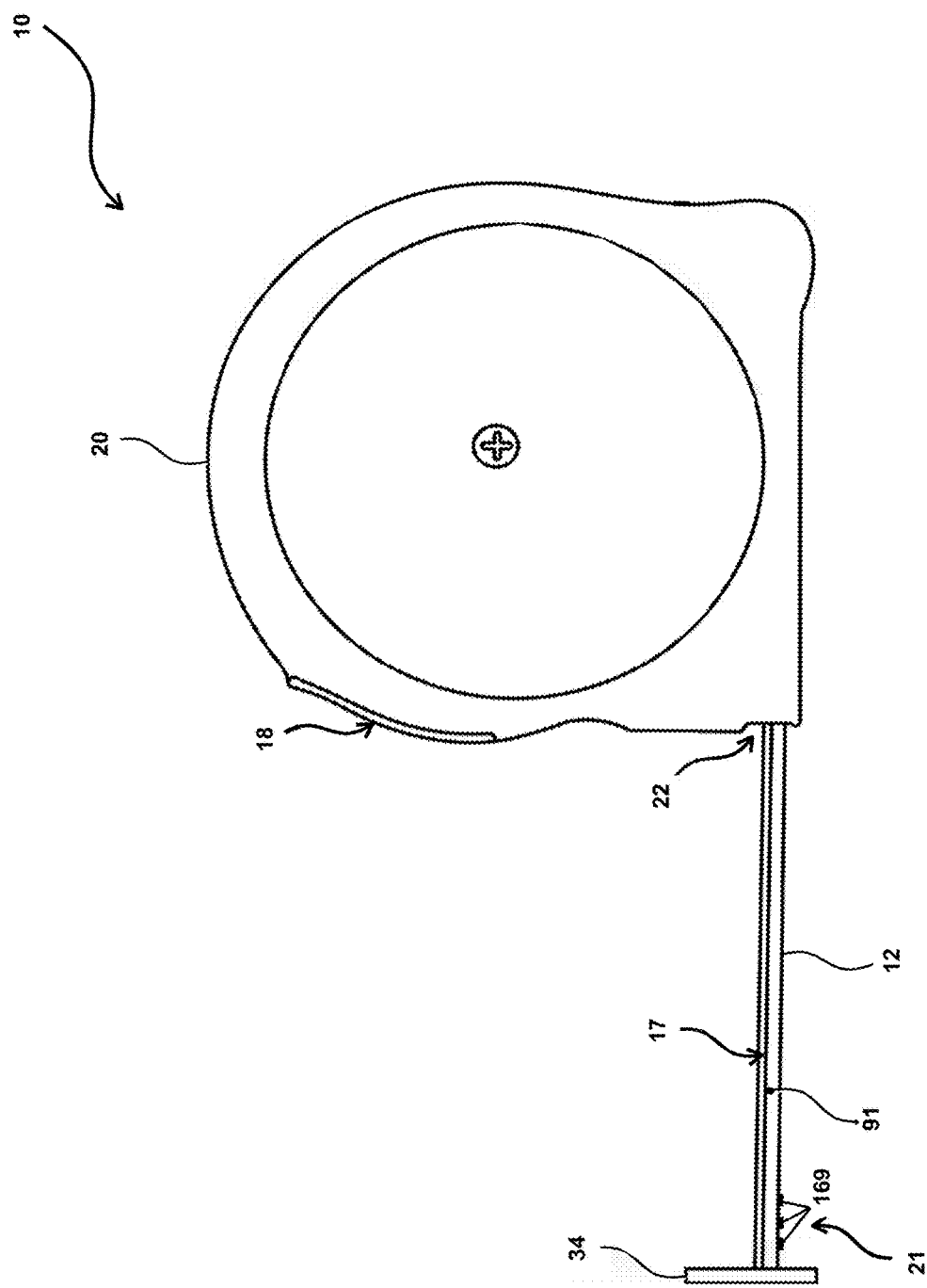
FIG. 1C illustrates a blade of the self-retracting tape measure in a partially extended position.

FIG. 1A-1C illustrate a self-retracting tape measure 10. In an embodiment, as shown in FIGS. 1A (perspective view) and 1B (cross-sectional view), the tape measure 10 includes an elongated tape measure blade 12 wound on a reel 14 that is rotatably mounted in a housing 20. The blade 12 is extendable through an opening 22 in housing 20. Blade 12 has a proximal end 19 that remains within the housing 20, and a distal end 21 that has a hook 34 coupled thereto. Tape measure 10 also includes a spring 16 within housing 20 configured to rotate reel 14 in housing 20 in a direction to wind up blade 12. In an embodiment, the end 19 of blade 12 terminates in a hook-like structure 30 that engages a first longitudinal end 35 of spring 16 to couple end 19 of blade 12 to spring 16. In some embodiments, reel 14 includes two reel members 78 (and another corresponding reel member on an opposite side of reel 14) that provide circular side walls on sides of spindle 15 about which blade 12 is wound. In an embodiment, spindle 15 is internally slotted to receive one end 37 of spring 16 to secure end 37 of spring 16 to spindle 15

In some embodiments a lock 18 may be provided in the tape measure 10 and may be configured to be actuated to hold blade 12 in any position of outward extension (e.g., moving the hook 34 away from housing 20, such as is shown in FIG. 1C). In an embodiment the lock 18 may comprise a slide lock such as that illustrated, while in other embodiments spring biased locking mechanisms or other such mechanisms may be utilized.

In some embodiments, blade 12 may comprise a ribbon of metal (e.g., steel) and one or more surfaces of blade 12 may include measurement indicia thereon. The measurement indicia may include measuring lines, digits, and/or other indicia for measuring lengths and/or distances, in one or more scales. In some embodiments the blade 12 may be associated with a digital encoder configured to provide a digital determination of the amount of extension of the hook 34 relative to a portion of the housing 20.

As shown in FIGS. 1A-1B, hook 34 is coupled to end 21 of blade 12 with a mounting portion 150 of the hook 34 engaging a first (e.g., concave or upper as described below) side 17 of end 21 of blade 12. In some embodiments, mounting portion 150 is provided with holes 166, described in greater detail below. One or more fasteners, such as rivets 169, may extend through holes 166 to mount hook 34 to blade 12. In some embodiments, hook 34 and/or mounting portion 150 may be similar to and/or the same as a hook and/or mounting portion described in U.S. Pat. No. 8,584,373, which is hereby incorporated by reference in its entirety.

FIG. 1C illustrates blade 12 in a partially extended position 87, so that hook 34 extends forward from the housing 20. Blade 12 is generally movable between a fully retracted position (e.g., as shown in FIGS. 1A and 1B) and a fully extended position (not shown). It can be appreciated from FIGS. 1A, 1B, and 1C (and the additional description below) that as blade 12 is unwound from reel 14, spring 16 is wound more tightly around the reel spindle 15. This winding of spring 16 around spindle 15 stores energy in spring 16 to provide spring powered rewinding of blade 12 around reel 14 when the extended blade 12 is released (either by hand, or when a lock such as lock 18 is disengaged. As may also be appreciated from the side view of FIG. 1C, the blade 12 may generally have a curved shape when not flattened inside the housing when the blade 12 is retracted, and as such, when the tape measure 10 is viewed from a side when the blade 12 is extended, a second (e.g., convex or lower) side 91 of the tape blade 12 may be seen, obscuring the mounting portion 150 of the hook 34 and the top of the rivets 169.

As discussed herein, an aspect of the present disclosure includes a method of creating a hole in a tape blade, such as the holes 166 in the blade 12, so as to create a secure connection region for a fastener such as the rivets 169 to extend therethrough. In particular, as shown in FIGS. 2-5, formation of the holes 166 in the end 21 of the blade 12 may be formed through a friction drilling process, where friction drilling flows substrate material of the blade 12 downward to reinforce the hole 166. Accordingly, as discussed herein, a bead of the substrate material may reinforce the hole 166 and reduce tearing of the blade 12.

As shown in FIG. 2, in an embodiment the blade 12, or stock material that may eventually be formed into the blade 12, may be provided so that a hole such as the hole 166 may be formed therein. In some embodiments, a pilot hole 166A may initially be punched through the blade at a hole axis A. In an embodiment, the hole axis A may extend perpendicular to a length of the blade 12 as it extends along a flat surface. In an embodiment the pilot hole 166A may be punched from the top surface 17 to the bottom surface 91 of the blade 12, while in another embodiment the pilot hole 166A may be punched from the bottom surface 91 to the top surface 17. In other embodiments other mechanisms for making the pilot hole 166A may be utilized, including but not limited to drilling and/or cutting the pilot hole 166A out of the blade 12 at the hole axis A. In an embodiment the formation of the pilot hole 166A would be through a method that creates a smooth edge without stress risers, and as such punching or drilling the pilot hole 166A may be preferable to other mechanisms of forming the pilot hole 166A, such as through plasma cutting. It may be appreciated that the size of the pilot hole 166A may depend on a desired size (e.g., diameter) of the fastener to ultimately be inserted therein, such as the diameter of the rivet 169. It may also be appreciated that the desired amount of material available for further steps in creation of the hole 166 described below may also guide an appropriate size for the pilot hole 166A. In one embodiment, the pilot hole 166A may have a diameter of approximately 0.0625". As the pilot hole 166A might not be utilized in some embodiments, it may be appreciated that in embodiments utilizing the pilot hole 166A, the pilot hole 166A may be any appropriate size that will be smaller than the ultimate hole 166 created through further processing.

It may be appreciated that creating a pilot hole 166A prior to further processing of the hole 166 may reduce shear stress during the further processing of the hole 166, and may maintain hook accuracy for appropriate positioning of the hook 34 relative to the blade 12 (as such positioning is important for accuracy of measurements relative to an innermost and/or outermost face of the hook 34). It may also be appreciated that the pilot hole 166 may produce a more consistent and smoother vertical wall of blade material during the further processing of the hole 166, as described below, or may determine the size of the vertical wall produced during the further processing, allowing creation of a vertical wall of a desired size for such further processing. It may be appreciated that in some embodiments, the larger a pilot hole 166A, the more consistently it may be formed in a blade 12 and across a production run of blades 12, while the smaller the pilot hole 166A, the greater a vertical wall would be formed. As such, in an embodiment the pilot hole 166A may be approximately 25-50% the size of the final diameter hole for production.

Turning to FIG. 3, in an embodiment a hole 166B may be formed by friction drilling the blade 12 at the hole axis A. In an embodiment including a pilot hole 166A, such pilot hole 166A may be larger than an initial point of a friction drilling bit used to create the hole 166B at the hole axis A. It may be appreciated that in an embodiment the diameter of the hole 166B may be dictated by a desired size of the fastener to ultimately be inserted therein. Accordingly, in some embodiments, the diameter of the hole 166B may be approximately between 0.03" and 1" in diameter. In an embodiment, the hole 166B may be approximately 0.098" in diameter. As shown, friction drilling of the hole 166 creates a protruding wall 170 extending from the blade 12. In an embodiment the wall 170 may extend from the second side 91 of the blade 12 to a plane of protrusion extension B by a length C, as discussed in greater detail below. It may be appreciated that in some embodiments the difference between the diameter of the pilot hole 166A and the diameter of the friction drilled hole 166B may dictate the amount of material that protrudes through, and thus the length C of the protruding wall 170. In other embodiments, other ways of controlling the length C of the protruding wall 170 may be utilized, such as by cutting, shaving, and/or sanding the protruding wall 170 after formation through the friction drilling. While in some preferred embodiments the hole 166B may be made into the pilot hole 166A, in embodiments where no pilot hole 166A would be formed, the hole 166B formed by friction drilling may be the first penetration into the blade 12, which may require such other mechanisms of controlling the length C of the protruding wall 170, which may determine the curl and overall diameter resulting from further processing of the protruding wall 170, as described in greater detail below. It may be appreciated that in embodiments lacking the pilot hole 166A, if the hole 166B is large, the length of the protruding wall 170 may be trimmed to a desired size prior to further processing such at that described below.

In an embodiment the friction drilling may be approximately 5,000 RPM drill rotation speed at 10 inch per minute (IPM) vertical movement along the hole axis A. In some embodiments, the friction drilling may comprise continuous rotation with one motion down, and one motion for retraction, while continuing to rotate so as to not bind with moved material. In other embodiments, the RPM and IPM may vary during the friction drilling, or the friction drilling may comprise a plurality of up and down motions to create the hole 166B. In some embodiments, the friction drilling rotation speed may be approximately between 1000-60000 RPM, while the vertical movement along the hole axis A may be approximately between 2-200 IPM. For example, in some embodiments, the friction drilling rotation speed may be approximately 15,000 RPM with vertical movement of approximately 10-15 Inches per minutes. It may be appreciated that the RPM and IPM may vary depending on the material of the blade 12, the feed rate, the drill size and shape, and other considerations across various embodiments. In an embodiment the length C of the protruding wall 170 formed by the friction drilling may be approximately 0.5×-10× the average thickness of the remainder of the blade 12 (e.g., the thickness F described with reference to FIG. 4 below). In an embodiment, the length C may be approximately 4× the average thickness of the remainder of the blade 12, such that a vertical measurement between the upper surface 17 and the plane B is approximately 5× the average thickness of the remainder of the blade (e.g., where the blade is generally 0.005" thick, such vertical measurement would be approximately 0.025"). In other embodiments the length C that the protrusion wall 170 extends may as formed through the friction drilling may be approximately between 0.0025" and 0.05".

Following creation of the protruding wall 170 by friction drilling, the protruding wall 170 may then be rolled or otherwise pressed against the second side 91 of the blade 12 to form a bead 180 surrounding a reinforced hole 166C. In an embodiment the bead 180 may extend from the second side 91 of the blade 12 to a plane of bead extension D by a length E. In an embodiment the bead 180 may be formed by rolling the protruding wall 170 with a die set. Other mechanisms of forming the bead 180 from the protruding wall 170 are also possible, including but not limited to heat melting the protruding wall 170, using a laser melting or forming the protruding wall 170, using rollers to shape the protruding wall 170, or so on.

It may be appreciated that an excessive size of protruding wall 170 created by the friction drilling may create an uncontrollable bead 180 which may mushroom outward rather than forming a nearly closed loop against the second side 91. Accordingly, in some embodiments, the length E that the bead 180 extends below the second side 91 of the blade 12 may be approximately between 1× and 2× as thick as the average thickness of the remainder of the blade (i.e. the thickness F as shown in FIG. 4). It may be appreciated that in an embodiment the depth of the reinforced hole 166C may be a length G, which may be thicker than a thickness G of the remainder of the blade 12 by the length E. In some embodiments, the length E that the bead 180 extends below the second side 91 may be thicker than the average thickness F of the remainder of the blade 12. Regardless, it may be appreciated that the length of the depth G of the reinforced hole 166C is greater than the thickness F of the remainder of the blade 12. In some embodiments, the average thickness F of the blade 12 may be approximately between 0.001" and 0.05", including in an embodiment being approximately 0.005" thick. As such, in some embodiments, the length E that the bead 180 extends below the second side 91 may be approximately between 0.001" and 0.1".

It may be appreciated that while in the illustrated embodiments the hole 166B is formed from the first side 12 into the second side 91 such that the protruding wall 170, and thus the bead 180, are located adjacent the second side 91 as described relative to the tape blade 12 of the tape measure 10 above, in other embodiments the drilling may be reversed such that the bead 180 ultimately is formed on the concave first side 17 of the tape blade 12.

Figure 5:
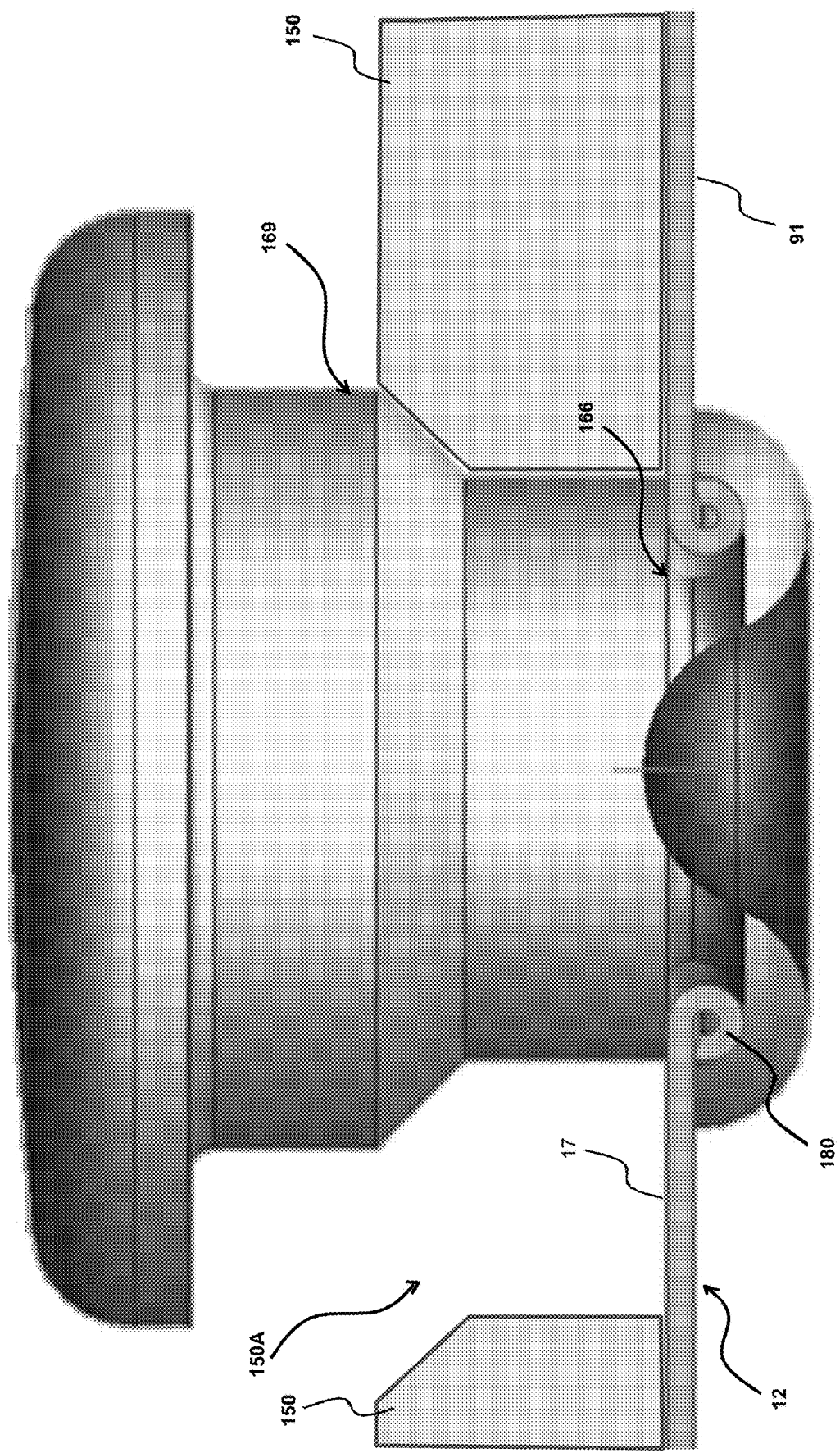
FIG. 5 illustrates a cross sectional view of hook end of the tape measure showing a rivet securing the hook to the blade.

As shown in FIG. 5, in an embodiment the reinforced hole 166C may be the same as the hole 166 described with reference to FIGS. 1A-1C above, ready for receiving the holes 150a of the mounting portion 150 of the hook 34 adjacent thereto, with the rivet 169 secured through the aligned holes 150A of the mounting portion 150 and the hole 166 of the blade 12, crimped over the bead 180. As shown, the hole 150A of the mounting portion 150 may be larger than the hole 166 that is firmly filled by the rivet 169, so that the hook 34 (and mounting portion 150) may move laterally relative to the blade 12, so that the hook 34 may move to account for the thickness of the hook 34 depending on whether an inside or outside measurement is being taken. In other embodiments the mounting portion 150 may be firmly fixed to the blade 12 by the rivet 169 or other appropriate fastener, and in some such embodiments other mechanisms for accounting for inside or outside measurements by the hook 34 may be utilized. As further shown in an embodiment a gap is provided above the mounting portion 150 and a head of the rivet 169, which may facilitate attaching hook attachments such as magnets, hook extenders, or other appropriate hook accessories. Again, while the illustrated embodiment in FIG. 5 illustrates a rivet, it may be appreciated that other fasteners such as threaded fasteners such as screws or bolts, or other appropriate fasteners, may be secured through the reinforced hole 166 over the bead 180.

While the hole described herein is formed from friction drilling in some embodiments, it may be appreciated that other mechanisms for forming the protrusion of blade material may be understood, including but not limited to additive deposition of blade material (e.g., laser deposition) to form either the vertical wall 170 or the bead 180 directly. For example, in an embodiment the blade may be positioned on a mold so that additive deposition of blade material forms a desired shape of bead 180. Aspects of such localized additive deposition of blade material, and other teachings implementable with the teachings of this disclosure, may be understood from U.S. patent application Ser. No. 16/246,919, entitled "Self-Retracting Tape Rule," incorporated herein by reference in its entirety.

While the tape measure illustrated herein is shown as a spring retractable short tape measure, the tape measure hook reinforcement discussed herein may be implemented with other types of measuring instruments utilizing an end hook, including but not limited to long-tapes (e.g., manually retractable with a reel). It may further be appreciated that the components described herein may be of different constructions or configurations, including but not limited to one or more being comprised of different material choices. For example, the components described herein may each be constructed from a variety of materials, including but not limited to one or more plastics, metals, rubbers, elastomers, or any other appropriate material choice. For example, in an embodiment one or more of the components may be formed of aluminum (e.g., machined aluminum), iron (e.g., steel), or any other appropriate material. In some embodiments, the material choices may differ from component to component.

Although aspects of the invention have been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A measuring tool comprising:
    an end hook having a mounting portion;
    a blade having a length and a width, the length being greater than the width;
    a hole extending through the blade along a hole axis, near a first end of the blade;
    a fastener extending through the hole and securing the blade to the mounting portion of the end hook;
    wherein the blade generally has an average first thickness along the length of the blade;
    wherein the hole formed in the blade has a depth of a second thickness;
    wherein second thickness is greater than the first thickness through a protrusion of blade material extending from the blade.

2. The measuring tool of claim 1, wherein the hole is round.

3. The measuring tool of claim 2, wherein the hole is circular, with a diameter between 0.03 inches and 1 inches.

4. The measuring tool of claim 1, wherein the hole axis extends perpendicular to the length of the blade as the blade is extended along a flat surface.

5. The measuring tool of claim 1, wherein the protrusion of blade material is folded away from the hole axis towards surrounding surfaces of the blade.

6. The measuring tool of claim 1 wherein the hole is formed through friction drilling.

7. The measuring tool of claim 6, wherein the friction drilling of the hole is through a pilot hole.

8. The measuring tool of claim 7, wherein the pilot hole is punched, and wherein the pilot hole is approximately 0.0625" in diameter.

9. The measuring tool of claim 8, wherein friction drilling through the pilot hole creates an interim hole along the hole axis that is approximately 0.098" in diameter, with a vertical wall approximately 0.025" tall.

10. The measuring tool of claim 9, wherein the vertical wall is rolled against the blade away from the hole axis to create the hole having the second thickness.

11. The measuring tool of claim 1, wherein the hole is approximately 0.098" inches in diameter.

12. The measuring tool of claim 1, wherein the blade is made of a single material.

13. The measuring tool of claim 1, wherein the blade is made of a plurality of materials.

14. The measuring tool of claim 13, wherein the protrusion of blade material is generally of a different material than a blade material generally extending along the length of the blade.

15. The measuring tool of claim 13, wherein the hole extends through a plurality of materials in the blade.

16. The measuring tool of claim 1, wherein the second thickness is approximately between 1-2 times the first thickness.

17. The measuring tool of claim 1, wherein the protrusion of blade material is from creation of the hole in the blade.

18. The measuring tool of claim 1, wherein the blade is biased to retract into a housing.

19. The measuring tool of claim 1, wherein the fastener comprises a rivet crimped over the protrusion of blade material.

20. A method of forming a tape measure blade with a reinforced connection to an end hook, the method comprising:
    forming a blade having a length and a width, the length being greater than the width, wherein the blade generally has an average first thickness along the length of the blade;
    forming a hole in the blade along a hole axis, near a first end of the blade, wherein the hole formed in the blade has a depth of a second thickness that is greater than the first thickness through a protrusion of blade material extending from the blade;
    extending a fastener through the hole to secure the blade to a mounting portion of the end hook.

21. The method of claim 20, wherein forming the hole in the blade along the hole axis comprises:
    friction drilling the hole through the blade along the hole axis, near a first end of the blade, to create the protrusion of blade material extending from the blade; and
    rolling the protrusion of blade material away from the hole axis against a side of the blade.

22. The method of claim 20, wherein forming the hole in the blade along the hole axis comprises depositing the protrusion of blade material adjacent to the hole axis through additive deposition.

* * * * *